(12) United States Patent
Brown

(10) Patent No.: US 6,741,061 B2
(45) Date of Patent: May 25, 2004

(54) EFFICIENT STATOR

(75) Inventor: Fred A. Brown, Coronado, CA (US)

(73) Assignee: Comair Rotron, Inc., San Diego, CA (US)

( * ) Notice: Subject to any disclaimer, the term of this patent is extended or adjusted under 35 U.S.C. 154(b) by 0 days.

(21) Appl. No.: 10/150,887

(22) Filed: May 17, 2002

(65) Prior Publication Data

US 2002/0180403 A1 Dec. 5, 2002

Related U.S. Application Data

(60) Provisional application No. 60/293,344, filed on May 24, 2001.

(51) Int. Cl.[7] .................................................. H02P 7/36
(52) U.S. Cl. ........................................ 318/772; 318/779
(58) Field of Search ................................ 318/268, 700, 318/704, 716, 717, 718, 720, 724, 767, 772, 773, 774, 778, 779

(56) References Cited

U.S. PATENT DOCUMENTS

| | | | | |
|---|---|---|---|---|
| 4,322,665 A | * | 3/1982 | Landgraf | 318/774 |
| 4,388,581 A | * | 6/1983 | Bhatnagar | 318/789 |
| 4,408,150 A | * | 10/1983 | Holston et al. | 318/779 |
| 4,520,303 A | * | 5/1985 | Ward | 318/778 |
| 4,549,121 A | | 10/1985 | Gale | 318/301 |
| 4,598,240 A | | 7/1986 | Gale et al. | 318/429 |
| 4,806,838 A | * | 2/1989 | Weber | 318/729 |
| 4,823,067 A | * | 4/1989 | Weber | 318/799 |
| 4,967,131 A | * | 10/1990 | Kim | 318/786 |
| 5,227,710 A | * | 7/1993 | Lewus | 318/781 |
| 5,321,342 A | | 6/1994 | Kruse | 318/254 |
| 5,710,493 A | | 1/1998 | Flynn | 318/254 |
| RE36,168 E | | 3/1999 | von der Heide et al. | 310/67 R |
| 6,329,783 B1 | * | 12/2001 | Vrionis et al. | 318/772 |

FOREIGN PATENT DOCUMENTS

| | | |
|---|---|---|
| EP | 0739080 A2 | 10/1996 |
| EP | 0872947 A1 | 10/1998 |

* cited by examiner

*Primary Examiner*—Bentsu Ro
(74) *Attorney, Agent, or Firm*—Bromberg & Sunstein LLP

(57) ABSTRACT

A stator in a synchronous fan includes first and second main windings, and an auxiliary winding. Illustratively, the first and second main windings are wound in a bifilar arrangement. In addition, the stator has a switch to switch the stator between a plurality of configurations. One of those configurations is an induction configuration that permits the first main winding to induce a voltage in the auxiliary winding when a current (e.g., a time-varying current) is transmitted through the first main winding. Moreover, the first main winding is electrically isolated from the auxiliary winding when in the induction configuration.

34 Claims, 5 Drawing Sheets

EFFICIENT STATOR

PRIORITY

This patent application claims priority from provisional U.S. patent application No. 60/293,344, having the title, "Efficient Stator," naming Fred A. Brown as the inventor, and filed on May 24, 2001, the disclosure of which is incorporated herein, in its entirety, by reference.

FIELD OF THE INVENTION

This invention relates generally to electric motors and, more particularly, this invention relates to efficient AC motor designs.

BACKGROUND OF THE INVENTION

Electric motors (e.g., AC electric motors, also referred to in the art as "synchronous motors") are used in a wide variety applications, such as in fans to rotate a propeller blade, and in disk drives to rotate magnetic disks. To these and other ends, electric motors have two primary portions; namely, a stationary portion ("stator") that produces a varying magnetic field, and a rotational portion ("rotor") that rotates in response to the variations in the magnetic field produced by the stator.

The stator in a synchronous motor typically includes a winding arrangement that converts an AC input signal (e.g., 230 volts AC) into the noted varying magnetic field. Accordingly, the windings are physically located in the stator so that they energize at strategic points in the intended rotation of the rotor. Each winding thus interacts with the rotor at a specified time in the rotor rotation cycle to generate and maintain rotor rotation. For example, a stator may include three windings that each are evenly spaced 120 degrees apart within a stator housing. Each winding thus energizes at selected times to provide one third (i.e., 120 degrees) of rotational energy (known in the art as "torque") to the rotor.

There is a continuing need in the art to increase the efficiency of synchronous motors. More particularly, among other things, more efficient synchronous motors should draw less current than those that are less efficient, while at the same time providing a comparable torque. Many current synchronous motor designs, however, are not efficient and/or have a relatively complex circuit arrangement. These noted problems thus increase one or both of motor operation and manufacturing costs.

SUMMARY OF THE INVENTION

In accordance with one aspect of the invention, a stator in a synchronous fan includes first and second main windings, and an auxiliary winding. Illustratively, the first and second main windings are wound in a bifilar arrangement. In addition, the stator has a switch to switch the stator between a plurality of configurations. One of those configurations is an induction configuration that permits the first main winding to induce a voltage in the auxiliary winding when a current (e.g., a time-varying current) is transmitted through the first main winding. Moreover, the first main winding is electrically isolated from the auxiliary winding when in the induction configuration.

In illustrative embodiments, a second voltage is induced in the second main winding when a first voltage is produced by the first main winding. The (induced) second voltage in the second main winding produces the induced voltage in the auxiliary winding. Among other values, the second voltage induced in the second main winding may be no greater than about half the first voltage in the first main winding.

The first main winding may include a first input, and the second main winding may correspondingly include a second input. The voltage is induced in the auxiliary winding when no signal is applied to the second input, and a signal is applied to the first input. The stator also may have a non-induction configuration where the first and second inputs are connected to electrically connect the auxiliary winding with the first and second main windings.

In some embodiments, the voltage is induced in the auxiliary winding by a magnetic field produced by the first main winding. A capacitance may be in series with the auxiliary winding to form an auxiliary branch, which is in parallel with the second main winding. The motor also includes a rotor that interacts with the stator to rotate. The rotor receives a sufficient amount of torque when in an at rest position when the voltage is induced to begin rotating. In exemplary embodiments, the current is an AC current that, when transmitted through the first main winding, produces a voltage in the first main winding.

In accordance with another aspect of the invention, a stator circuit for use in a stator of an AC electric motor includes first and second main windings, and an auxiliary winding. The second main winding and auxiliary winding are within a first closed loop (i.e., permitting current flow). The first main winding and second main winding are connectable in a second closed loop. The first and second main windings are configured so that when in operation and not connected in the second closed loop with the second main winding, a first voltage in the first main winding induces a second voltage in the second main winding.

In some embodiments, the first main winding is wound in a bifilar configuration with the second main winding. The circuit may further have a first input in electrical communication with the first main winding, and a second input in electrical communication with the second main winding and the auxiliary winding. The two inputs are electrically connectable to form the second closed loop. When in operation and the two inputs are not electrically connected, the first main winding is not in the second closed loop with the second main winding.

In other embodiments, when in operation and the first winding is not in the second closed loop with the second main winding, the first voltage is applied to the first input only. In still other embodiments, when in operation and the first winding is not in the second closed loop with the second main winding, the first main winding is not electrically impacted by a third voltage applied to the second input when no voltage is applied to the first input.

The second voltage may cause an auxiliary voltage in the auxiliary winding. When in use and the first main winding is connected in the second closed loop with the second main winding, the first main winding illustratively is electrically connected in parallel to the second main winding. The auxiliary winding may be physically located about 90 degrees from the first main winding within the motor. When in operation, the stator circuit is capable of applying more torque when the first main stator is in the second closed loop with the second main winding than when the first main stator is not in the second closed loop with the second main winding.

In accordance with still another aspect of the invention, a stator circuit for use in a stator of an AC electric motor has first and second main windings, and an auxiliary winding.

The auxiliary winding is in electrical communication with the second main winding. The circuit further includes an apparatus for controlling the first and second main windings to be in either one of a low state and a high state. The high state provides higher torque than the low state (when in operation). When in the low state, the first main winding is electrically isolated from the second main winding. The windings are configured so that a first voltage across the first main winding induces a second voltage in the second main winding.

The controlling means also permits the windings to be in a medium state. When in the medium state, the first main winding illustratively is electrically isolated from the second main winding, and a third voltage in the second main winding has no electrical impact on the first main winding. When in the high state, the first main winding illustratively is in parallel with the second main winding, and a fourth voltage applied to the first and second main windings produces a voltage across the auxiliary winding.

BRIEF DESCRIPTION OF THE DRAWINGS

The foregoing description of various embodiments of the invention should be appreciated more fully from the following further description thereof with reference to the accompanying drawings wherein.

DESCRIPTION OF ILLUSTRATIVE EMBODIMENTS

In illustrative embodiments of the invention, a synchronous motor includes a stator circuit for efficiently controlling the rotation of a rotor. The stator circuit includes an auxiliary winding that, when operating at a low speed, has an induced voltage caused by energization of one or more main windings. At the noted low speed, because its voltage is induced, the auxiliary winding is not directly energized. Details of illustrative embodiments are discussed below.

Figure 1:
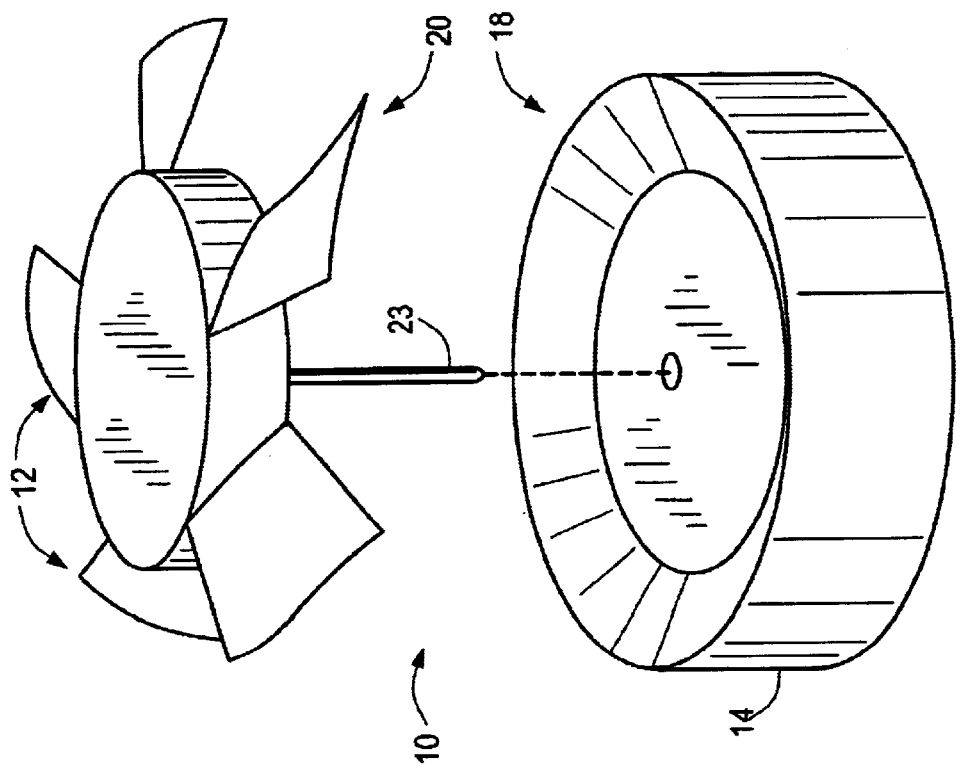
FIG. 1 schematically shows an exploded view of a motor that may be configured in accordance with illustrative embodiments of the invention.

The stator circuit preferably is implemented within a synchronous motor (i.e., driven by AC power) having a rotor and a stator to control rotor rotation. For example, FIG. 1 schematically shows an exploded view of portions of an electric motor (referred to herein as "motor 10") that may be produced in accordance with illustrative embodiments of the invention. The motor 10 shown in FIG. 1 includes a propeller 12 and thus, is a part of a cooling fan. To that end, the motor 10 includes a housing 14 with venturi (not shown), a stator portion 18 secured to the housing 14, and a rotor 20 (which includes the propeller 12). The stator portion 18 at least in part may include the noted stator circuit (identified by reference number 19). The motor 10 also includes a shaft 23 to rotatably secure the rotor 20 to the stator portion 18.

In illustrative embodiments, the rotor 20 includes a well known wire cage, which often is referred to in the art as a "squirrel-cage." The magnetic field produced by the stator circuit 19 interacts with the squirrel cage in the rotor 20 to cause rotor rotation.

It should be noted that although a propeller 12 is shown, embodiments of the invention apply to other elements that perform a similar air flow function. For example, an impeller may be used and thus, considered equivalent to a propeller. Nevertheless, although the motor 10 is implemented as a fan, some embodiments apply to other applications that use electric motors. Accordingly, description of the motor 10 as a fan is by illustration only and not intended to limit various embodiments of the invention.

Figure 2:
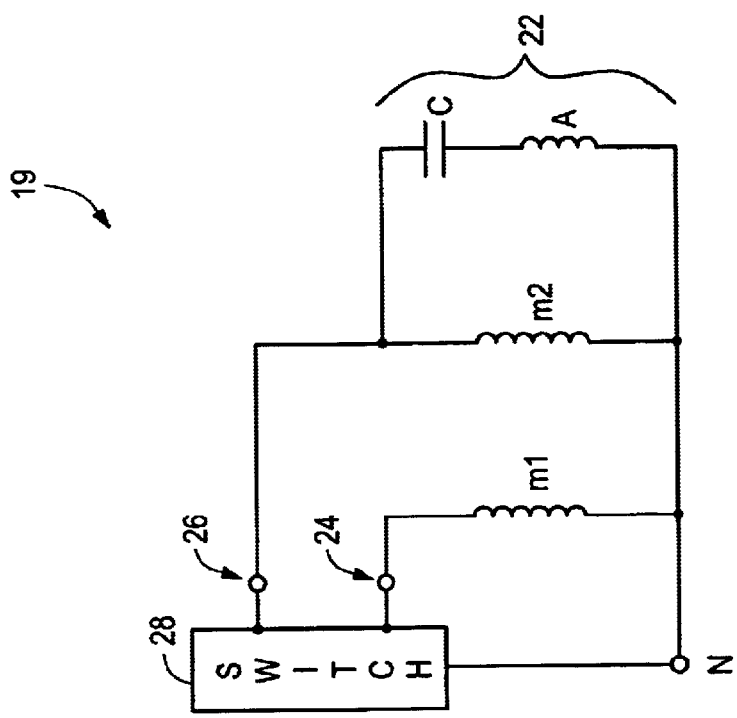
FIG. 2 schematically shows a circuit configured in accord with illustrative embodiments of the invention.

FIG. 2 schematically shows the noted stator circuit 19, which is configured in accordance with illustrative embodiments of the invention. In the embodiment shown, the stator circuit 19 includes a first main winding M1, a second main winging M2, and an auxiliary branch 22 coupled in parallel with the second main winding M2. The auxiliary branch 22 includes an auxiliary winding A with a serially connected capacitor C to ensure a ninety degree phase shift of an input AC signal. The auxiliary branch 22 and the second main winding M2 are considered to form a closed circuit loop.

Figure 3:
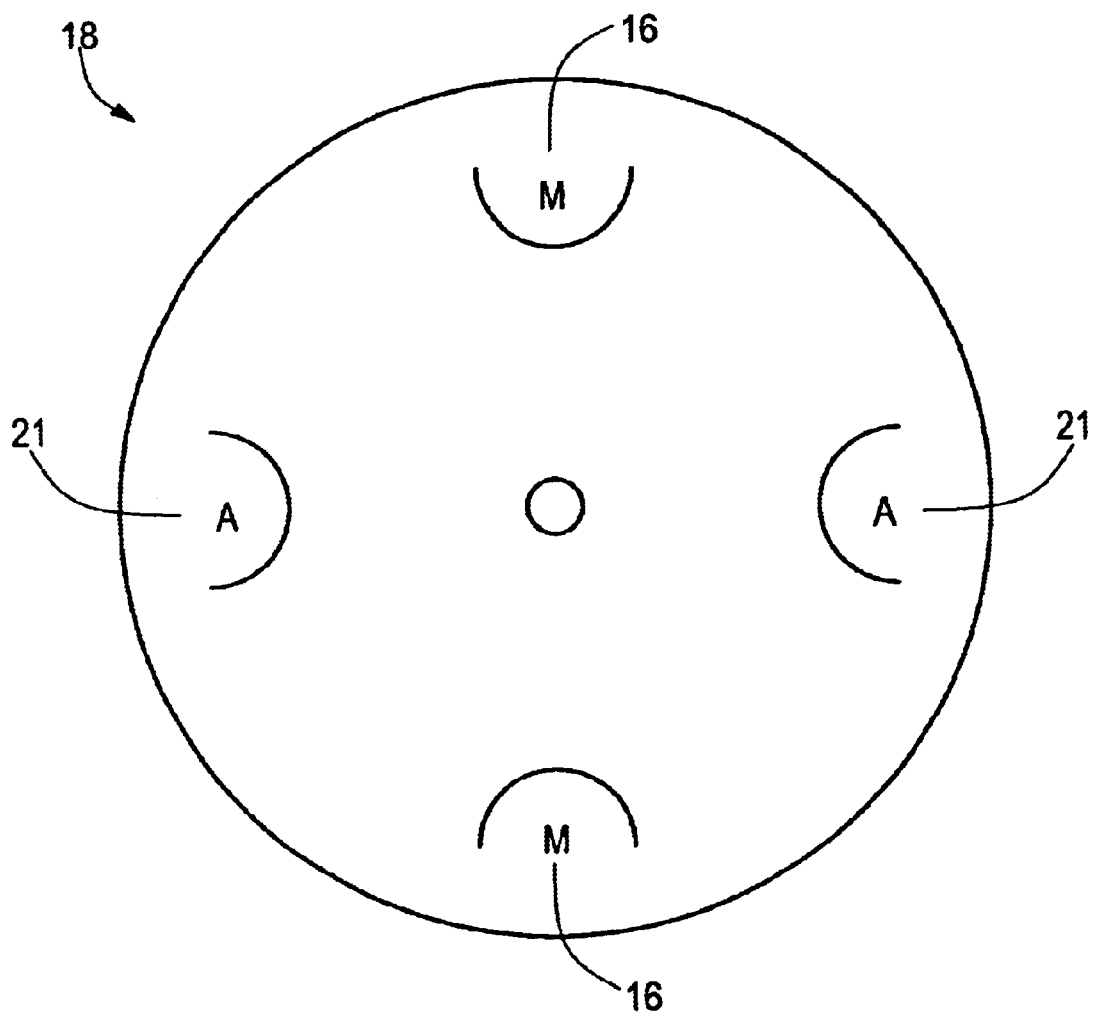
FIG. 3 schematically shows the relative positions of the windings in an exemplary motor configured in accordance with illustrative embodiments of the invention.

In illustrative embodiments, the auxiliary winding A is physically located (in the stator portion 18) relative to the main windings M1 and M2 in a manner permitting the phase shift of the capacitor C to properly rotate the rotor. More particularly, FIG. 3 shows a portion of a stator in an exemplary synchronous motor 10, in which the main windings M1 and M2 are wound on a first pair of poles (main poles 16) that are 180 degrees opposed from each other. In a similar manner, the auxiliary winding A is wound across a second pair of poles (auxiliary poles 21) that also are 180 degrees opposed to each other.

All poles 16 and 21 in the stator portion 18 thus are evenly spaced to be ninety degrees apart. As suggested above, the capacitor C causes the auxiliary poles 21 to energize 90 degrees out of phase with the main poles 16. Consequently, during use, the pair of auxiliary poles 21 and the main poles 16 alternatively provide the primary torque to the rotor as it rotates through each 360 degree revolution. For example, in the motor 10 shown, the polarity of each pole pair 16 and 21 changes every ninety degree rotation of the rotor 20.

In accordance with illustrative embodiments of the invention, the first and second main windings M1 and M2 are wound in a bifilar configuration. As known by those skilled in the art, a bifilar configuration may be one in which the wires of the two coils are wound at the same time around the same stator lamination stack. The term "bifilar winding" is used herein as known by those skilled in the art. Accordingly, in the exemplary embodiment shown, both the first and second main windings M1 and M2 are wrapped about both main poles 16, while the auxiliary winding A is wrapped about the auxiliary pole 21.

Returning to FIG. 2, the main coils M1 and M2 illustratively are electrically connected at one end to the neutral return of the input signal source, but not necessarily electrically connected at their other ends. More particularly, the first main coil M1 includes a first input 24 for receiving an input signal, while the second main coil M2 similarly includes a second input 26 also for receiving an input signal. The input signal for both inputs 24 and 26 is an AC signal that energizes the entire stator circuit 19. The two inputs 24 and 26 preferably are connected to a switch 28 that permits the motor 10 to operate in one of a low, medium, and high speed mode. When in the low and medium speed modes, the two inputs 24 and 26 are electrically isolated. When in the high speed mode, the two inputs 24 and 26 are electrically connected.

In some embodiments, the stator circuit 19 does not include the switch 28. Instead, the user connects either one or both of the inputs 24 and 26 directly to the AC energizing signal. Accordingly, many embodiments do not require the switch 28. In such embodiments, the inputs 24 and 26 are connectable to each other, the AC energizing signal, or some other apparatus that transmits the AC energizing signal to one or both of the inputs 24 and 26.

During experiments, when in the low speed mode, the stator circuit 19 provided enough torque to start rotor rotation from an at rest position. Moreover, the stator circuit 19 started rotor rotation in the correct rotational direction. Accordingly, when in this mode (i.e., state), an AC signal (e.g., an AC voltage, such as 230 volts AC) is applied to the first input 24 only. No signal is applied to the second input 26 and thus, the AC signal is not directly transmitted through the second main winding M2 and the auxiliary branch 22.

Since the main windings M1 and M2 are in a bifilar configuration, the current (and resultant voltage/magnetic field) transmitted through the first main winding M1 inductively produces a voltage through the second main winding M2. In illustrative embodiments, the induced voltage through the second main winding M2 is about half that of the voltage of the main winding M1. Because the second main winding M2 is in a closed loop with the auxiliary winding A, the voltage induced in the second main winding M2 itself causes a time varying voltage and current to pass through in the auxiliary winding A. The capacitor C ensures that the time varying voltage/current (electrically) is about ninety degrees out of phase with the main windings M1 and M2. As a result of this energization, the rotor begins rotating (from rest) at a relatively low rate and in the desired direction.

When in the medium speed mode, the AC signal is applied to the second input 26, and no signal is applied to the first input 24. This causes a stronger voltage to be formed directly across both the second main winding M2 and the auxiliary branch 22. In a manner unlike the voltage on such elements when in the low speed mode, this direct voltage is not induced since the input signal is applied directly to their common node. This increased voltage consequently produces a stronger torque producing magnetic field, thus causing the rotor 20 to rotate at a higher speed than when in the low speed mode. It should be noted that no current is produced across the first main winding M1 in this mode because the first main winding M1 is an open circuit. In other words, the first main winding M1 is not in electrical communication with the second main winding M2.

When in the high speed mode, the first and second inputs 24 and 26 are coupled (by the switch 28), and the input signal is simultaneously applied directly to each of the first main winding M1, second main winding M2, and the auxiliary winding A. As a consequence of this coupling, the circuit 10 appears to have a lower resistance than when in the other two modes, thus producing a more efficient running motor. In particular, the two main windings M1 and M2 are in parallel in this configuration, thereby reducing their effective inductance and thus, their effective impedance. This should reduce the current draw of the stator circuit 19. Described qualitatively, the single input voltage is distributed across more windings (i.e., all three windings) when in this mode, thus causing the stator circuit 19 to draw less current.

Figure 4:
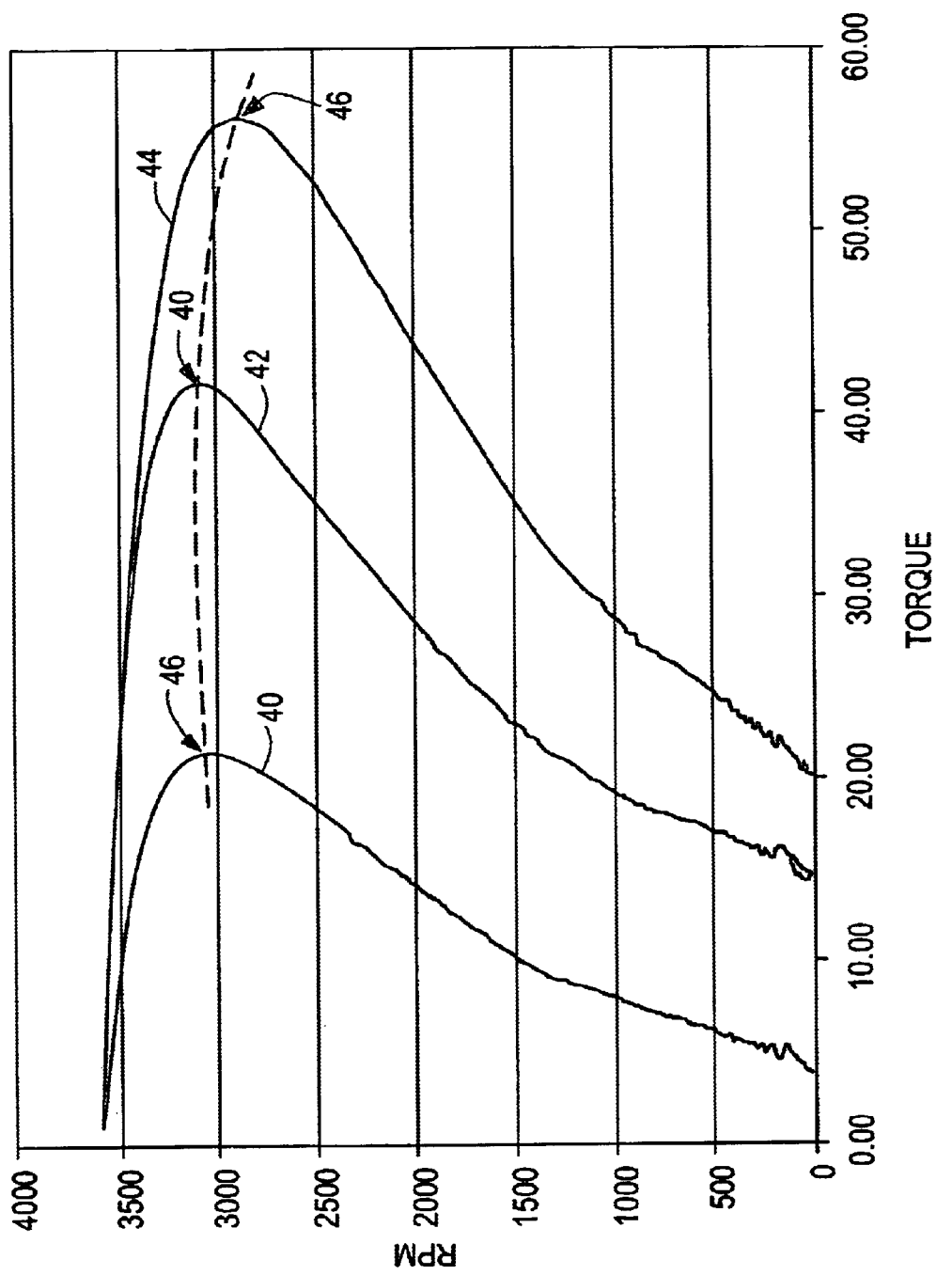
FIG. 4 shows an exemplary torque-speed plot of a motor implementing the stator circuit shown in FIG. 2.
Figure 5:
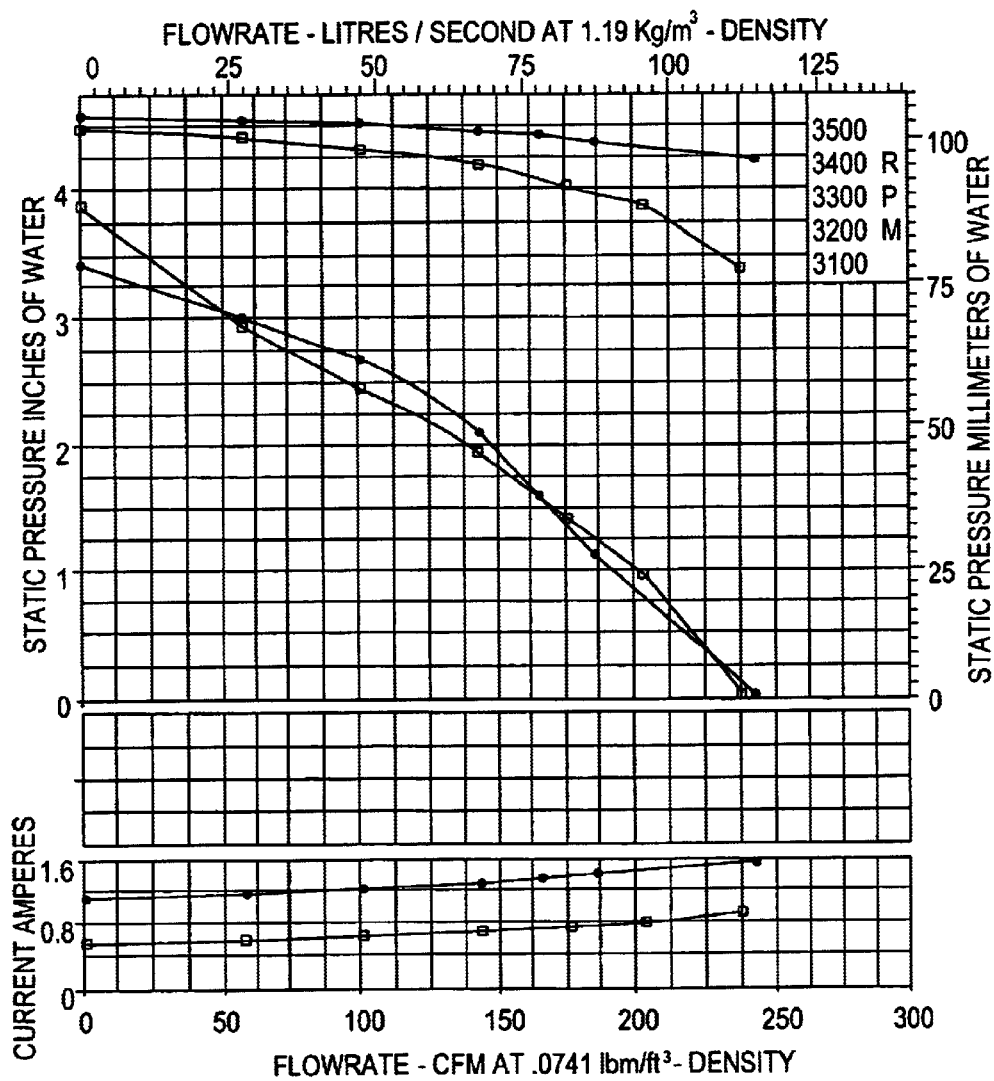
FIG. 5 graphically shows the performance of a motor implementing illustrative embodiments compared to a conventional motor not implementing illustrative embodiments of the invention.

FIG. 4 shows an exemplary torque-speed plot of a motor implementing the stator circuit 19 shown in FIG. 2. The plot graphically shows the motor RPM (revolutions per minute) performance as torque changes. Specifically, the plot includes a low speed curve 40 (i.e., only the first input 24 receives the energizing signal), a medium speed curve 42 (i.e., only the second input 26 receives the energizing signal), and a high speed curve 44 (i.e., both the first and second inputs 24 and 26 receive the energizing signal). It is preferred that during operation, each signal remains above their respective knees (each respectively identified by reference number 46). This ensures that the RPM does not drop too low. For example, for the low and medium speed curves, it is preferred that the motor coordinate with torque to maintain its RPM above about 3000 RPMs.

In experiments, it was determined that a motor configured as described herein typically runs cooler than conventional synchronous motors running at similar speeds. Moreover, motors configured in this manner also were determined to have a longer lifetime than conventional motors. Among other reasons, this advantage is realized due to the motor using all the windings when in the high speed mode. More specifically, various experiments were conducted to compare a motor implementing the stator circuit 19 as shown in FIG. 2 ("subject motor") against a conventional motor not implementing such circuit 10 ("conventional motor"). FIG. 4 graphically displays the results of one such test. As shown by the lower two curves, the subject motor has similar performance, but draws much less current than, the conventional motor. In particular, in this experiment, the subject motor drew about half the current of the conventional motor.

In some embodiments of the invention, the switch 28 does not switch between each of low speed, medium speed, and high speed. For example, in some embodiments, the switch 28 merely switches between low and high speeds, or medium and high speeds. In addition, those skilled in the art should understand that varying the input voltage signal also varies the torque provided by the stator circuit 19. Nevertheless, in the embodiment shown, the same input voltage may be used at all three speeds.

Figure 6:
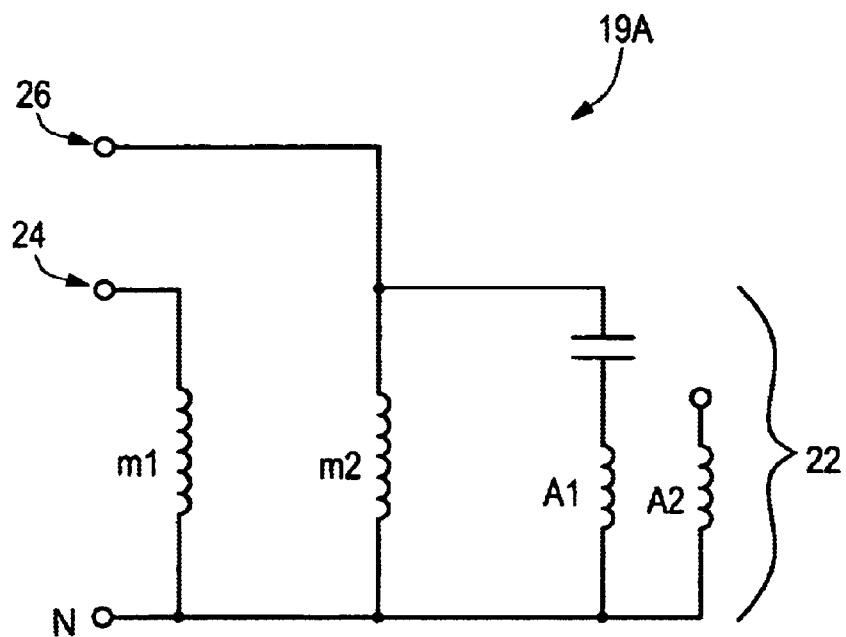
FIG. 6 schematically shows an alternative stator circuit that may be used in the motor shown in FIG. 1.

FIG. 6 schematically shows an alternative stator circuit 19A that may be used in the motor 10 shown in FIG. 1. In a manner similar to the stator circuit 19 shown in FIG. 2, the stator circuit 19A includes a first main winding M1, a second main winging M2, and an auxiliary branch 22 coupled in parallel with the second main winding M2. The auxiliary branch 22 and the second main winding M2 are considered to form a closed circuit loop. No switch is included in this stator circuit 19A. Of course, a switch can be included if desired.

Unlike the stator circuit 19 in FIG. 2, the auxiliary branch 22 includes a pair of connectable auxiliary windings A1 and A2. More particularly, the first auxiliary winding A1 is coupled in series with a capacitor C, and the second auxiliary winding A2 is alternatively connectable in parallel with the first auxiliary winding A1. When not connected in parallel with the first auxiliary winding A1, the second auxiliary winding A2 is connected to one end of the auxiliary winding A1, but connected to nothing at its other end. It thus is an open circuit in such state. Although not shown, the stator circuit 19A may include a switch to alternatively connect the two auxiliary windings A1 and A2.

The two auxiliary windings A1 and A2 illustratively are wound so that when connected in parallel, they induce magnetic fields in each other. To that end, the auxiliary windings A1 and A2 may be wound in a bifilar manner across both poles 21 shown in FIG. 3. Consequently, when the auxiliary windings A1 and A2 are connected, they produce additional motor speeds. Moreover, the motor 10 should be capable of handling higher torques/loads.

Although various exemplary embodiments of the invention have been disclosed, it should be apparent to those skilled in the art that various changes and modifications can be made that will achieve some of the advantages of the invention without departing from the true scope of the invention. For example, although a permanent split capacitor motor is shown, some embodiments are not limited to such a configuration.

What is claimed is:

1. A stator in a synchronous fan, the stator comprising:
   a first main winding;
   a second main winding;
   an auxiliary winding,
   the first and second main windings being wound in a bifilar arrangement; and
   a switch to switch the stator between a plurality of configurations,
   one of the plurality of configurations being an induction configuration that permits the first main winding to induce a voltage in the auxiliary winding when a current is transmitted through the first main winding, the first main winding being electrically isolated from the auxiliary winding when in the induction configuration.

2. The stator as defined by claim 1 wherein a second voltage is induced in the second main winding when a first voltage is produced by the first main winding, the induced voltage in the second main winding producing the induced voltage in the auxiliary winding.

3. The stator as defined by claim 2 wherein the second voltage induced in the second main winding is no greater than about half the first voltage in the first main winding.

4. The stator as defined by claim 1 wherein the first main winding includes a first input, and the second main winding includes a second input, the voltage being induced in the auxiliary winding when no signal is applied to the second input, and a signal is applied to the first input.

5. The stator as defined by claim 4 wherein the stator has a non-induction configuration where the first and second inputs are connected to electrically connect the auxiliary winding with the first and second main windings.

6. The stator as defined by claim 1 wherein the voltage is induced in the auxiliary winding by a magnetic field produced by the first main winding.

7. The stator as defined by claim 1 further including a capacitance in series with the auxiliary winding to form an auxiliary branch, the auxiliary branch being in parallel with the second main winding.

8. The stator as defined by claim 1 wherein the motor includes a rotor that interacts with the stator to rotate, the rotor receiving a sufficient amount of torque when in an at rest position when the voltage is induced to begin rotating.

9. The stator as defined by claim 1 wherein the current is an AC current, the AC current producing a voltage in the first main winding.

10. A stator circuit for use in a stator of an AC electric motor, the stator circuit comprising:
    a first main winding;
    a second main winding; and
    an auxiliary winding,
    the second main winding and auxiliary winding being within a first closed loop,
    the first main winding and second main winding being connectable in a second closed loop, the first and second main windings being configured so that when in operation and not connected in the second closed loop with the second main winding, a first voltage in the first main winding induces a second voltage in the second main winding.

11. The stator circuit as defined by claim 10 wherein the first main winding is wound in a bifilar configuration with the second main winding.

12. The stator circuit as defined by claim 10 further comprising:
    a first input in electrical communication with the first main winding; and
    a second input in electrical communication with the second main winding and the auxiliary winding, the two inputs being electrically connectable to form the second dosed loop.

13. The stator circuit as defined by claim 12 wherein when in operation and the two inputs are not electrically connected, the first main winding is not in the second closed loop with the second main winding.

14. The stator circuit as defined by claim 13 wherein when in operation and the first winding is not in the second closed loop with the second main winding, the first voltage is applied to the first input only.

15. The stator circuit as defined by claim 13 wherein when in operation and the first winding is not in the second closed loop with the second main winding, the first main winding is not electrically impacted by a third voltage applied to the second input when no voltage is applied to the first input.

16. The stator circuit as defined by claim 10 wherein the second voltage causes an auxiliary voltage in the auxiliary winding.

17. The stator circuit as defined by claim 10 further comprising a capacitance in series with the auxiliary winding to form an auxiliary branch, the auxiliary branch being in parallel with the second main winding.

18. The stator circuit as defined by claim 10 wherein when in use and the first main winding is connected in the second dosed loop with the second main winding, the first main winding is electrically connected in parallel to the second main winding.

19. The stator circuit as defined by claim 10 wherein the auxiliary winding is physically located about 90 degrees from the first main winding within the motor.

20. The stator circuit as defined by claim 10 wherein when in operation, the stator circuit is capable of applying more torque when the first main winding is in the second dosed loop with the second main winding than when the first main winding is not in the second dosed loop with the second main winding.

21. The stator circuit as defined by claim 10 including an additional auxiliary winding connectable in parallel with the auxiliary winding.

22. A stator circuit for use in a stator of an AC electric motor, the motor having a rotor, the stator circuit comprising:
    a first main winding;
    a second main winding; and
    an auxiliary winding in electrical communication with the second main winding,
    means for controlling the first and second main windings to be in either one of a low state and a high state, the high state providing higher torque than the low state when in operation, when in the low state, the first main winding being electrically isolated from the second main winding, the windings being configured so that a first voltage across the first main winding induces a second voltage in the second main winding, the second voltage being capable of causing the rotor to rotate.

23. The stator circuit as defined by claim 22 wherein the means for controlling also permits the first and second main windings to be in a medium state, the first main winding being electrically isolated from the second main winding, a third voltage in the second main winding having no electrical impact on the first main winding.

24. The stator circuit as defined by claim 22 wherein when in the high state and operating, the first main winding is in parallel with the second main winding, a fourth voltage applied to the first and second main windings produces a voltage across the auxiliary winding.

25. The stator circuit as defined by claim 22 wherein the first main winding is wound in a bifilar configuration with the second main winding.

26. A stator in a synchronous fan, the stator comprising:
a first main winding;
a second main winding;
an auxiliary winding,
the first and second main windings being wound in a bifilar arrangement; and
the windings capable of being coupled in a plurality of configurations,
one of the plurality of configurations being an induction configuration that permits the first main winding to induce a voltage in the auxiliary winding when a current is transmitted through the first main winding, the first main winding being electrically isolated from the auxiliary winding when in the induction configuration.

27. The stator as defined by claim 26 wherein a second voltage is induced in the second main winding when a first voltage is produced by the first main winding, the induced voltage in the second main winding producing the induced voltage in the auxiliary winding.

28. The stator as defined by claim 27 wherein the second voltage induced in the second main winding is no greater than about half the first voltage in the first main winding.

29. The stator as defined by claim 26 wherein the first main winding includes a first input, and the second main winding includes a second input, the voltage being induced in the auxiliary winding when no signal is applied to the second input, and a signal is applied to the first input.

30. The stator as defined by claim 29 wherein the stator has a non-induction configuration where the first and second inputs are connected to electrically connect the auxiliary winding with the first and second main windings.

31. The stator as defined by claim 26 wherein the voltage is induced in the auxiliary winding by a magnetic field produced by the first main winding.

32. The stator as defined by claim 26 further including a capacitance in series with the auxiliary winding to form an auxiliary branch, the auxiliary branch being in parallel with the second main winding.

33. The stator as defined by claim 26 wherein the motor includes a rotor that interacts with the stator to rotate, the rotor receiving a sufficient amount of torque when in an at rest position when the voltage is induced to begin rotating.

34. The stator as defined by claim 26 wherein the current is an AC current, the AC current producing a voltage in the first main winding.

* * * * *

UNITED STATES PATENT AND TRADEMARK OFFICE
CERTIFICATE OF CORRECTION

PATENT NO.   : 6,741,061 B2
DATED        : May 25, 2004
INVENTOR(S)  : Fred A. Brown It is certified that error appears in the above-identified patent and that said Letters Patent is hereby corrected as shown below:

Column 8,
Lines 18, 41, 49 and 51, replace "dosed" with -- closed --.

Signed and Sealed this

Nineteenth Day of April, 2005

JON W. DUDAS
*Director of the United States Patent and Trademark Office*